(12) United States Patent
Mager et al.

(10) Patent No.: US 6,617,039 B1
(45) Date of Patent: Sep. 9, 2003

(54) NITROGEN-FREE COMPOUNDS AS ADHESION PROMOTERS FOR SILICON-BASED SCRATCH-RESISTANT COATINGS ON POLYCARBONATE

(75) Inventors: Michael Mager, Leverkusen (DE); Jürgen Kirsch, Leverkusen (DE); Steffen Hofacker, Butzbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/009,964

(22) PCT Filed: Jun. 16, 1999

(86) PCT No.: PCT/EP00/05118
§ 371 (c)(1),
(2), (4) Date: Dec. 12, 2001

(87) PCT Pub. No.: WO00/77100
PCT Pub. Date: Dec. 21, 2000

(30) Foreign Application Priority Data

Jun. 16, 1999 (DE) .......................................... 199 27 409

(51) Int. Cl.$^7$ .............................................. B32B 25/20
(52) U.S. Cl. ...................... 428/447; 428/412; 556/413; 556/427; 556/429; 556/440; 556/449; 106/282.1; 427/387
(58) Field of Search .......................... 427/387; 428/447, 428/412; 556/413, 427, 429, 440, 449; 106/287.1

(56) References Cited

U.S. PATENT DOCUMENTS

| | | | |
|---|---|---|---|
| 4,299,886 A | 11/1981 | Soejima et al. | 428/412 |
| 4,315,091 A | 2/1982 | Steinberger et al. | 528/28 |
| 5,371,262 A | 12/1994 | Arkles | 556/449 |
| 5,677,410 A | 10/1997 | Mager et al. | 528/15 |
| 5,880,305 A | 3/1999 | Kraus et al. | 556/459 |
| 6,005,131 A | 12/1999 | Jentsch et al. | 556/434 |
| 6,008,285 A | 12/1999 | Kasemann et al. | 524/430 |
| 6,136,939 A | 10/2000 | Mager et al. | 528/33 |
| 6,228,921 B1 | 5/2001 | Kasemann et al. | 524/381 |
| 6,271,292 B1 | 8/2001 | Mager et al. | 524/261 |

FOREIGN PATENT DOCUMENTS

| | | |
|---|---|---|
| DE | 19724396 | 12/1998 |
| EP | 263428 | 7/1997 |
| GB | 2113698 | 8/1983 |

OTHER PUBLICATIONS

Journal of Sol–Ger Science and Technology, 11, (month unavailable) 1998, pp. 153–159, J. Gilberts et al, "UV Curable Hard Transparent Hybrid Coating Materials on Polycarbonate Prepared by the Sol–Gel Method".

23 International Conference in Organic Coatings (month unavailable) 1997, pp. 271–279, D. Katsamberis et al, "Highly Durable Coatings for Automative Polycarbonate Glazing".

Primary Examiner—Robert Dawson
Assistant Examiner—Kuo-Liang Peng
(74) Attorney, Agent, or Firm—Joseph C. Gil; Thomas W. Roy

(57) ABSTRACT

The invention relates to a process for coating a substrate with a nitrogen-free compound corresponding to formula (I) and/or a hydrolysis product or condensation product $$[R^1(R^2)_j]_i SiR^3_k(OR^4)_{4-k-i} \qquad (I),$$

wherein
i represents the number 1, 2 or 3,
j represents an integer from 1 to 10,
k represents the number 0, 1 or 2,
k+i is ≦3, and
$R^1$ represents OH, OR, SH, SR, OOC—R,
R represents $C_1$–$C_{10}$-alkyl or $C_6$–$C_{12}$-aryl,
$R^2$ is an unsubstituted, singly substituted, or doubly substituted methylene group,
$R^3$ is a substituted or unsubstituted $C_1$–$C_{10}$-alkyl or $C_6$–$C_{12}$-aryl group,
$R^4$ represents a $C_1$–$C_{10}$-alkyl or $C_6$–$C_{12}$-aryl group, and
wherein if j represents from 2 to 10 the methylene groups in the chain may optionally be interrupted once or several times by hetero atoms.

6 Claims, 1 Drawing Sheet

NITROGEN-FREE COMPOUNDS AS ADHESION PROMOTERS FOR SILICON-BASED SCRATCH-RESISTANT COATINGS ON POLYCARBONATE

BACKGROUND OF THE INVENTION

This invention relates to the use of nitrogen-free compounds as adhesion promoters for silicon-based scratch-resistant coatings on plastics.

Plastics are extremely versatile materials which have a number of desirable properties. However, a disadvantage of these materials is for example the susceptibility of their surfaces to physical damage. Various chemicals such as, for example, many solvents, may also cause considerable damage to the surfaces of plastics.

One method of protecting the surfaces of plastics from such damage is to apply a suitable coating. This, like the plastic itself, may in turn consist of a variety of materials. This is primarily dependent on whether the surface is to be protected rather from physical damage or from the action of chemicals. In the case of transparent plastics such as, for example, polycarbonates, superficial physical damage is of course particularly disadvantageous. Numerous coating materials which effectively protect in particular polycarbonates from physical damage are known. These are substantially silicon-based scratch-resistant coatings which are mostly condensation- or UV-curing. Examples may be found in J. Sol-Gel Sci. Techn. 1998, 11, 153–159, Abstr. 23rd Annual Conference in Organic Coatings, 1997, 271–279, EP-A 02 63 428, DE-A 29 14 427 and DE-A 43 38 361.

However, the problem frequently associated with the application of silicon-based scratch-resistant coatings is that the adhesion between plastic and coating is inadequate. There are already a number of known methods of nevertheless obtaining a satisfactory adhesion. These include physical methods such as, for example, plasma treatment or corona treatment, or the use of an adhesion promoter.

Many adhesion promoters react both with the surface of the plastic and with the scratch-resistant coating. (Covalent) chemical bonds may be formed in the process. In the case of the coating of polycarbonates, commonly used compounds include aminosilanes, such as aminopropyltrialkoxysilanes; the amino group reacts with the polycarbonate surface and the alkoxysilyl group reacts with the silicon-based scratch-resistant coating. However, nitrogen-containing adhesion promoters have the disadvantage that the basic nitrogen function (for example, a primary amine) causes considerably damage to the polycarbonate, a fact manifested inter alia visually by a considerable yellow coloration. A further serious disadvantage is that the adhesion of silicon-based scratch-resistant coatings rapidly diminishes during storage in water, in particular warm water, and the film ultimately peels off completely. In addition, bubble formation and clouding frequently occur.

Accordingly, the object of the present invention was the provision of adhesion promoters which lead to a good adhesion of silicon-based scratch-resistant coatings to polycarbonate, without having the above-mentioned disadvantages, such as detraction from the visual appearance (yellow coloration) and lability in water.

SUMMARY OF THE INVENTION

The present invention accordingly provides the use of nitrogen-free compounds corresponding to formula (I) and/or their hydrolysis products and condensation products $$[R^1(R^2)_j]_i SiR^3_k(OR^4)_{4-k-i} \qquad (I),$$

wherein i denotes the number 1, 2 or 3, j denotes an integer from 1 to 10, k denotes the number 0, 1 or 2, k+i is $\leq 3$, and $R^1$ denotes OH, OR, SH, SR, OOC—R, with R being $C_1$–$C_{10}$-alkyl or $C_6$–$C_{12}$-aryl, $R^2$ is an optionally singly or doubly substituted methylene group, wherein $R^1$ is a preferred substituent, and the methylene groups in the chain may optionally be interrupted once or several times by hetero atoms, $R^3$ is an optionally substituted $C_1$–$C_{10}$-alkyl or $C_6$–$C_{12}$-aryl group and $R^4$ denotes a $C_1$–$C_{10}$-alkyl or $C_6$–$C_{12}$-aryl group, preferably a $C_1$–$C_4$-alkyl group, as adhesion promoters for silicon-based scratch-resistant coatings on polycarbonate.

Figure 1:
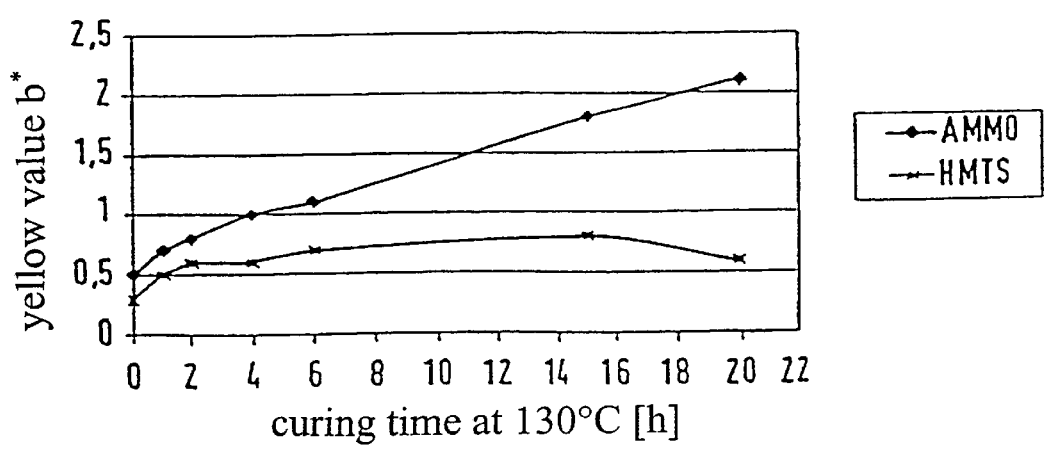
FIG. 1 shows the yellowing performance of a composition according to the invention (containig hydroxymethyl triethoxysilane) and the yellowing performance of a comparison composition (containing 3-aminopropyl trimethoxysilane) by plotting the yellow value b* against the curing time at 130 degrees C.

The adhesion promoters used according to the invention show a very good adhesion of the coating to the plastic without detracting from the visual properties. In particular, no yellow coloration occurs. The coatings do not peel off even after storage in water.

DETAILED DESCRIPTION OF THE INVENTION

Preferably, nitrogen-free compounds corresponding to formula (II) and/or their hydrolysis products and condensation products are used $$[R^1(R^2)_j]_i SiR^3_k(OR^4)_{4-k-i} \qquad (II),$$

wherein i denotes the number 1, j denotes an integer from 1 to 5, k denotes the number 0 or 1 and $R^1$ denotes OH, OR, SH, SR, OOC—R, with R being $C_1$–$C_4$-alkyl or $C_6$-aryl, $R^2$ denotes a methylene group optionally substituted with $R^1$, $R^3$ denotes a $C_1$–$C_4$-alkyl or $C_6$-aryl group and $R^4$ denotes a $C_1$–$C_4$-alkyl group.

Particularly preferably, nitrogen-free compounds corresponding to formula (III) and/or their hydrolysis products and condensation products are used $$[R^1(R^2)_j]_i SiR^3_k(OR^4)_{4-k-i} \qquad (III),$$

wherein i denotes the number 1, j denotes the number 1, 2 or 3, k denotes the number 0 or 1 and R$^1$ denotes OH, OR, SH, SR, OOC—R, with R being C$_1$–C$_4$-alkyl or C$_6$-aryl, R$^2$ denotes a methylene group optionally substituted with R$^1$ and R$^3$, R$^4$ independently of one another denote a methyl or ethyl group.

Most preferably, nitrogen-free compounds corresponding to formula (IV) and/or their hydrolysis products and condensation products are used

  (IV), wherein i denotes the number 1, j denotes the number 1, k denotes the number 0 or 1 and R$^1$ denotes OH, R$^2$ denotes a methylene group and R$^3$, R$^4$ independently of one another denote a methyl or ethyl group.

Examples of compounds for use according to the invention are nitrogen-free adhesion promoters corresponding to formulae (Va) to (Vl) are:

(Va) HO—CH$_2$—Si(OCH$_3$)$_3$, (Vb) HO—CH$_2$—Si(OCH$_2$CH$_3$)$_3$, (Vc) HO—CH$_2$—Si(CH$_3$)(OCH$_3$)$_2$, (Vd) HO—CH$_2$—Si(CH$_3$)(OCH$_2$CH$_3$)$_2$, (Ve) HO—CH$_2$—Si(CH$_3$)$_2$(OCH$_3$), (Vf) HO—CH$_2$—Si(CH$_3$)$_2$(OCH$_2$CH$_3$), (Vg) HO—(CH$_2$)$_2$—Si(OCH$_3$)$_3$, (Vh) HO—(CH$_2$)$_2$—Si(OCH$_2$CH$_3$)$_3$, (Vi) HO—(CH$_2$)$_3$Si(OCH$_3$)$_3$, (Vj) HO—(CH$_2$)$_3$Si(OCH$_2$CH$_3$)$_3$, (Vk) HS—(CH$_2$)$_3$—Si(OCH$_2$CH$_3$)$_3$, (Vl) HS—CH$_2$—Si(CH$_3$)(OCH$_2$CH$_3$).

The hydrolysis products and condensation products of the compounds corresponding to formula (I) are easily obtainable by reaction with water, conventionally in a suitable solvent and in the presence of a catalyst. The carrying out of this sol-gel reaction, i.e. the hydrolysis of the organyloxysilanes corresponding to formula (I) with water and the condensation of the reaction products to form compounds of higher molecular weight is known in principle to the person skilled in the art.

The preparation of the silylmethanols (Va) and (Vb) is described in detail in U.S. Pat. No. 5,371,262; the methyl-substituted compounds (Vc) to (Vf) can be obtained in a similar way.

Polycarbonates for the purpose of the invention are commercially available polycarbonates, for example, types of Makrolon®. The adhesion promoters are equally suitable for use on polycarbonate blends such as, for example, types of Bayblend®.

Silicon-based coatings for the purpose of the invention include all transparent materials which contain at least one structural element Si(O)$_{4/2}$, R—Si(O)$_{3/2}$, (R)$_2$Si(O)$_{2/2}$ or (R)$_3$Si(O)$_{1/2}$, are obtained by radiation curing or thermal curing and which, applied to plastics, ensure an improvement in the scratch resistance compared with that of the uncoated plastic. The scratch resistance can be tested, for example, by means of the Taber Abraser test (ISO 3537, DIN 52 347).

Examples of silicon-based coatings which may be mentioned are those based on polyfunctional organosil(ox)anes, which efficiently protect polycarbonate from physical damage and chemical action.

Such polyfunctional organosilanes, as well as the production of coatings from them, are described, for example, in DE-A 1 96 03 241, DE-A 1 96 03 242, WO 98/52992 and WO 98/38251.

Further examples of silicon-based coatings are commercial scratch-resistant coatings based on methyltrialkoxysilane-bonded silica sol (for example, AS 4000, General Electric). These are described, for example, in Abstr. 23$^{rd}$ Annual Conference in Organic Coatings, 1997, 271–279.

The adhesion promoters may be used pure, or diluted with a solvent. Suitable solvents are generally alcohols, such as methanol, ethanol, 1-propanol, 2-propanol, 1-butanol, 2-butanol, amyl alcohols, 1-methoxy-2-propanol, as well as mixtures of the aforementioned. Other solvents may also be used, but in the main with the proviso that the polycarbonate is not excessively dissolved.

The adhesion promoters can be applied to the plastic by means of all the known techniques, for example, spraying, dipping, centrifuging, blade-coating, flow-coating or pouring. Any solvents which may optionally be present are removed afterwards at temperatures of 15° C. to just above the softening point of the polycarbonate used. The thermal treatment may be useful for enhancing the promotion of adhesion, even without the presence of highly volatile constituents. On Makrolon®, the adhesion promoter is thermally treated, for example, at 80° C. to 130° C. for 30 to 60 minutes. The silicon-based scratch-resistant coating can then be applied and cured immediately, or after storage of the polycarbonate which has been pretreated as described.

Besides or in addition to the thermal treatment, the adhesion promotion can also be accelerated by the addition of suitable catalysts. Examples which may be mentioned are organometallic compounds, such as dibutyltin dilaurate.

The adhesion promoter may also be provided with UV protecting agents, such as Tinuvin®.

The polycarbonate bearing a scratch-resistant coating which is obtained through the use of nitrogen-free adhesion promoters according to the invention can be employed in the form of sheets and mouldings in a variety of areas of application. An example which may be given is the replacement of (flat) glass in the construction and automobile sectors.

EXAMPLES

Introductory Comments

Purchasable educts from Aldrich, such as tetraethyl orthosilicate (TEOS), aminopropyltrimethoxysilane (AMMO), aluminium tri-sec-butoxide (ASB) and 1-methoxy-2-propanol, were used without further purification. The concentration of the aqueous p-toluenesulfonic acid used was 0.1 mol/l. The polyfunctional organosiloxane {OSi(CH$_3$)[(CH$_2$)$_2$Si(OH)(CH$_3$)$_2$]}$_4$ (D4-silanol) was prepared as described in DE 1 97 11 650. The polycarbonate plates used (10×10 cm) were commercially available Makrolon®, type 3103, from Bayer AG, Leverkusen.

The adhesion promoters and the scratch-resistant coatings were applied by centrifuging; the maximum number of revolutions is given in r/min and the retention time at the maximum number of revolutions is given in seconds.

The cross-cut adhesion test was carried out in accordance with ISO 2409, using a cross-cutting apparatus from Erichsen (lattice spacing: 1 mm). The condition of the coating before and after the removal of the strip of adhesive is given (before/after). The scratch resistance was determined in accordance with ASTM D 1044. The clouding was measured in accordance with ASTM D 1003. The increase in scattered light ("delta haze") after the scratching process is given.

Example 1

Comparison of the Adhesive Strength
a) Preparation of the Coating Solution:
5.0 g D4-silanol, 10.6 g 1-methoxy-2-propanol, 6.4 g TEOS and 1.1 g aqueous p-toluenesulfonic acid were mixed together in the order given, with stirring. After having been stirred for 60 minutes, the solution was diluted with 2.6 g 1-methoxy-2-propanol and then applied as described below.
b) Coating with Adhesion Promoter and Scratch-resistant Coating From a):
Two Makrolon® plates were first of all coated with AMMO and hydroxymethyltriethoxysilane (50 wt. % in ethanol) respectively using a doctor blade (depth of cut 30 μm) and were then thermally treated for one hour at 80° C. Subsequently, the coating solution from a) was likewise applied by means of a doctor blade (depth of cut 60 μm). After ventilation for 10 minutes at room temperature, the combined layers were cured for a further hour at 130° C.

The results of the cross-cut adhesion test showed a very good adhesion in both samples (0/0).

Example 2

Comparison of the Water Resistance
Preparation of a Coating Solution Based on D4-silanol
 a) TEOS-prehydrolysate: 7.8 g aqueous p-toluenesulfonic acid was added, with stirring, to a mixture of 80 g TEOS and 44 g 1-methoxy-2-propanol; the mixture was stirred for 30 minutes, then a further 7.8 g aqueous p-toluenesulfonic acid was added and the mixture was subsequently stirred for one hour.
 b) Complexed ASB: At 0° C., 12.6 g acetoacetic ester was added to 24 g ASB in 7.8 g 1-methoxy-2-propanol; the ice cooling was then removed and the reaction mixture was stirred for a further 50 minutes.
(Solutions a) and b) were prepared at about the same time).
 c) Coating solution: At 0° C., the complexed ASB from b) was added to the TEOS prehydrolysate from a); the mixture was stirred for 5 minutes, then 15.6 g aqueous p-toluenesulfonic acid was added, after this addition the icecooling was removed and the reaction mixture was stirred for a further hour. Finally, another solution of 21.2 g D4-silanol in 39.1 g 1-methoxy-2-propanol was added and the mixture was stirred again for one hour at room temperature. The coating solution obtained was colourless and clear.

Scratch-resistant coating of Makrolon® using the coating solution from Example 1

For the purpose of promoting adhesion, two Makrolon® plates were first of all coated with AMMO and hydroxymethyltriethoxysilane (50 wt. % in ethanol) respectively (2000 r/min, 20 sec) and were then thermally treated for 30 minutes at 130° C. The coating solution from Example 1 was then applied (500 r/min, 20 sec). After 60 h at room temperature and one hour at 130° C., the Makrolon® plates bearing a scratch-resistant coating were again cooled to room temperature and stored in distilled water at 65° C. As shown in Table 1, only the adhesion promoter according to the invention is resistant to storage in water.

TABLE 1

| Adhesion promoter | Visual impression/cross-cut adhesion test | | | | |
| --- | --- | --- | --- | --- | --- |
| | 1 day | 2 days | 3 days | 4 days | 8 days |
| AMMO | >40% of the surface shows white clouding/considerable peeling off ¼ | Test terminated, no usable results were obtainable | | | |
| Hydroxymethyl triethoxysilane (according to the invention) | visually unchanged/no peeling off 0/0 | visually unchanged/no peeling off 0/0 | visually unchanged/no peeling off 0/0 | visually unchanged/no peeling off 0/0 | visually unchanged/no peeling off 0/0 |

Example 3

Comparison of the Thermal Yellowing (Increase in Yellow Colour)

Seven Makrolon® plates were first of all coated with AMMO and a further seven with hydroxymethyltriethoxysilane (50 wt. % in ethanol), by means of centrifuging (2000 r/min, 20 sec), and all the plates were then thermally treated for 1 hour at 80° C. Subsequently, the coating solution from Example 2) was likewise applied by means of centrifuging (750 r/min, 20 sec). The samples were then thermally treated under the conditions given in Table 2.

TABLE 2

| Sample No. | Adhesion promoter*) | Storage at room temperature [h] | Curing at 130° C. [h] | Yellow value b* |
| --- | --- | --- | --- | --- |
| 1 | AMMO | 24 | 0 | 0.5 |
| 2 | AMMO | 24 | 1 | 0.7 |
| 3 | AMMO | 24 | 2 | 0.8 |
| 4 | AMMO | 24 | 4 | 1.0 |
| 5 | AMMO | 24 | 6 | 1.1 |
| 6 | AMMO | 24 | 15 | 1.8 |
| 7 | AMMO | 24 | 20 | 2.1 |
| 8 | HMTS | 24 | 0 | 0.3 |
| 9 | HMTS | 24 | 1 | 0.5 |
| 10 | HMTS | 24 | 2 | 0.6 |
| 11 | HMTS | 24 | 4 | 0.6 |
| 12 | HMTS | 24 | 6 | 0.7 |

TABLE 2-continued

| Sample No. | Adhesion promoter*) | Storage at room temperature [h] | Curing at 130° C. [h] | Yellow value b* |
|---|---|---|---|---|
| 13 | HMTS | 24 | 15 | 0.8 |
| 14 | HMTS | 24 | 20 | 0.6 |

*)AMMO = 3-aminopropyltrimethoxysilane; HMTS = hydroxymethyltriethoxysilane

The yellow values (b*) listed in Table 2 indicate clearly that the nitrogen-containing adhesion promoter leads to an extreme thermal yellowing. Where the adhesion promoter according to the invention is used, however, no steady increase in the yellow value during heat stress is observed. This correlation is illustrated graphically in FIG. 1.

What is claimed is:

1. In a process for preparing a silicon-based scratch-resistant coating on a polycarbonate substrate comprising applying an adhesion promoter to said polycarbonate and then applying a silicon-based scratch-resistant coating thereto, the improvement wherein said adhesion promoter consists essentially of a nitrogen-free compound corresponding to formula (I) and/or a hydrolysis product or condensation product thereof $$[R^1(R^2)_j]_i SiR^3_k (OR^4)_{4-k-i} \qquad (I),$$

wherein i represents the number 1, 2 or 3, j represents an integer from 1 to 10, k represents the number 0, 1 or 2, k+i is $\leq 3$, and $R^1$ represents OH, OR, SH, SR, OOC—R, where R represents $C_1$–$C_{10}$-alkyl or $C_6$–$C_{12}$-aryl, $R^2$ is an unsubstituted, singly substituted, or doubly substituted methylene group, $R^3$ is a substituted or unsubstituted $C_1$–$C_{10}$-alkyl or $C_6$–$C_{12}$-aryl group, $R^4$ represents a $C_1$–$C_{10}$-alkyl or $C_6$–$C_{12}$-aryl group, and wherein if j represents from 2 to 10, the methylene groups in the chain may optionally be interrupted once or several times by hetero atoms.

2. The process of claim 1, wherein the improvement further comprises heating the adhesion promoter to a temperature of form 80° C. to 130° C. for from 30 to 60 minutes.

3. The process of claim 1 wherein $R^2$ is a methylene group.

4. The process of claim 1 wherein $R^4$ represents a $C_1$–$C_4$-alkyl group.

5. The process of claim 1 wherein the nitrogen free compound comprises a member selected from the group consisting of (Va) HO—CH$_2$—Si(OCH$_3$)$_3$, (Vb) HO—CH$_2$—Si(OCH$_2$CH$_3$)$_3$, (Vc) HO—CH$_2$—Si(CH$_3$)(OCH$_3$)$_2$, (Vd) HO—CH$_2$—Si(CH$_3$)(OCH$_2$CH$_3$)$_2$, (Ve) HO—CH$_2$—Si(CH$_3$)$_2$(OCH$_3$), (Vf) HO—CH$_2$—Si(CH$_3$)$_2$(OCH$_2$CH$_3$), (Vg) HO—(CH$_2$)$_2$—Si(OCH$_3$)$_3$, (Vh) HO—(CH$_2$)$_2$—Si(OCH$_2$CH$_3$)$_3$, (Vi) HO—(CH$_2$)$_3$Si(OCH$_3$)$_3$, (Vj) HO—(CH$_2$)$_3$Si(OCH$_2$CH$_3$)$_3$, (Vk) HS—(CH$_2$)$_3$—Si(OCH$_2$CH$_3$)$_3$, and (Vl) HS—CH$_2$—Si(CH$_3$)(OCH$_2$CH$_3$)$_2$.

6. The product produced by the process of claim 1.

* * * * *